(12) United States Patent
Hall

(10) Patent No.: US 11,884,345 B2
(45) Date of Patent: Jan. 30, 2024

(54) DEVICE FOR REMOVING, STORING AND INSTALLING CONVERTIBLE SUV HARD TOPS

(71) Applicant: Frederick Hall, Melbourne, FL (US)

(72) Inventor: Frederick Hall, Melbourne, FL (US)

( * ) Notice: Subject to any disclaimer, the term of this patent is extended or adjusted under 35 U.S.C. 154(b) by 227 days.

(21) Appl. No.: 17/604,966

(22) PCT Filed: Oct. 6, 2021

(86) PCT No.: PCT/US2021/053695
§ 371 (c)(1),
(2) Date: Oct. 19, 2021

(87) PCT Pub. No.: WO2022/076506
PCT Pub. Date: Apr. 14, 2022

(65) Prior Publication Data
US 2023/0257042 A1    Aug. 17, 2023

Related U.S. Application Data

(63) Continuation of application No. 17/245,696, filed on Apr. 30, 2021, now Pat. No. 11,332,208.
(Continued)

(51) Int. Cl.
*B62D 65/02* (2006.01)
*B66F 19/00* (2006.01)
*B66F 11/00* (2006.01)
B66C 23/48 (2006.01)
B25H 1/00 (2006.01)

(52) U.S. Cl.
CPC .......... *B62D 65/022* (2013.01); *B25H 1/0007* (2013.01); *B66C 23/48* (2013.01);
(Continued)

(58) Field of Classification Search
CPC ...... B66F 7/26; B66F 9/00; B66F 9/02; B66F 3/08; B66F 3/10
See application file for complete search history.

(56) References Cited

U.S. PATENT DOCUMENTS 5,609,332 A * 3/1997 Hassell .................... B66F 3/08
269/61
9,186,777 B2 * 11/2015 Woods .................... B25B 5/04
(Continued)

FOREIGN PATENT DOCUMENTS

KR          134747 Y1    3/1999
KR      200277354 Y1    6/2002

OTHER PUBLICATIONS

U.S. Appl. No. 16/172,736, filed Oct. 27, 2018, Hall.
(Continued)

*Primary Examiner* — Tyrone V Hall, Jr.
(74) *Attorney, Agent, or Firm* — William Gray Mitchell

(57) ABSTRACT

A device designed for the removal, storage, and installation of removable hardtops from convertible sport utility vehicles, comprising a wheeled base unit, a vertical support structure and a platform assembly, wherein the base unit is aligned directly below the platform unit and the vertical support structure connects them together, wherein the device can be disassembled for simple shipping, is adjustable for height and depth to accommodate different SUV models, and includes markers for easy assembly.

14 Claims, 8 Drawing Sheets

Related U.S. Application Data

(60) Provisional application No. 63/090,769, filed on Oct. 13, 2020, provisional application No. 63/088,165, filed on Oct. 6, 2020.

(52) U.S. Cl.
CPC ............ *B66C 23/485* (2013.01); *B66F 11/00* (2013.01); *B66F 19/00* (2013.01)

(56) References Cited

U.S. PATENT DOCUMENTS

| | | | |
|---|---|---|---|
| 9,643,823 B2 * | 5/2017 | Hall | ............ B66C 23/48 |
| D974,692 S * | 1/2023 | Cullinan | ............ D34/28 |

OTHER PUBLICATIONS

U.S. Appl. No. 16/953,732, filed Feb. 28, 2021, Hall.
U.S. Appl. No. 17/245,696, filed Apr. 30, 2021, Hall.
"Performance TV—EP 1708" (Masters Entertainment Group) Mar. 21, 2017, URL: https://www/youtube.com/watch?time_continue=3&v=YrHdMCw5Z14&feature=emb_logo>entire document, esp. 6:30-11:30.
"Source Code" (TopLift Pros) Feb. 12, 2020 (Feb. 12, 2020) <URL: https://uploads-ssl webflow.com/59249fc364efbd2b0eb398bc/5a95acfc892ae800019375f1_Instruction_Manual_v4.0.compressed_pdf> Assembly instructions.
International Search Report and Written Opinion for associated international application PCT/US21/53695, dated May 17, 2022.

* cited by examiner

DEVICE FOR REMOVING, STORING AND INSTALLING CONVERTIBLE SUV HARD TOPS

CROSS REFERENCE TO RELATED APPLICATIONS

This application claims priority to international application PCT/US21/53695, filed Oct. 6, 2021, thereby to both U.S. Ser. No. 17/245,696, filed Apr. 30, 2021 and U.S. provisional 63/088,165, filed Oct. 6, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a device for the removal, storage and installation of convertible sport utility vehicle (SUV) hard tops.

Background of the Invention

Convertible two door and four door SUVs are typically sold with collapsible soft tops standard on these vehicles. For many individuals, these convertible soft tops do not provide adequate weather or noise insulation. Additionally, it can be a difficult task to collapse and erect the soft tops on the vehicle, particularly on the 4-door vehicles.

Various types of removable hard tops have been made available and configured to replace the standard collapsible soft tops for the different convertible SUVs. These convertible hard tops provide significantly better weather and noise insulation than their soft top counterparts. However, in order to enjoy the convertible feature of an SUV it is often desirable to remove the hard top.

A SUV removable hard top is typically configured to be easily attachable and detachable to the SUV. Typical SUV removable hard tops are relatively heavy, bulky, and awkward to handle. The size and weight present a significant problem for removal and installation, especially by one person working alone. Typically, a group of at least two people is required to remove or install SUV removable hard tops. In order to further share the weight load, a group of four people is preferable to lift and remove or install a removable hardtop, with each person handling or lifting each corner of the hardtop in concert with others in the group.

In order to simplify the process of installing and removing hardtops from the convertible SUVs, many owners will utilize specialized overhead lifts that are installed in their garages to perform this function. When utilizing these overhead lifts, owners will position their vehicle below the stationary lifts, and then connect the hardtop to the overhead lift, release the hardtop from the SUV, lift the hardtop above the SUV, and then drive the vehicle from underneath the lift and detached hardtop. Similarly, when installing the hardtop the vehicle will be positioned under the lift and hardtop, which will be then lowered onto the SUV.

While these lifts are an effective method of removing and installing convertible hardtops on an SUV, they can provide logistical issues. First and foremost, utilization of a hoist-style lift as described above requires the owner of the vehicle to have a garage or other support structure available onto which the hoist system can be installed. Not all owners of these types of vehicles have these facilities available to them. Additionally, these types of lifts are fixed and not portable. Therefore, they may not be suitable for owners of these types of vehicles who may rent or who want to have the ability to remove the top from their vehicle at locations other than their home, such as when they are on vacation or a camping trip. The fixed nature of such systems can also result in difficulties reinstalling the hard top after removal, as the vehicle must be precisely positioned for proper reinstallation. Finally, most of these fixed position lift devices do not allow for parking vehicle in the garage while hard top is affixed to the device.

Variations of a freestanding device capable of installing and removing a hardtop from a convertible SUV as well as compactly storing such hardtop while disengaged from the vehicle are known from U.S. Pat. No. 9,643,823 and U.S. patent application Ser. No. 16/172,736, each to Applicant, Federick Hall. The Hall documents teach a movable device allowing a single user to remove, store and reinstall a SUV hardtop, with a vertical lifting means for raising and lowering such hardtop while disengaged from the SUV.

The disclosures of the Hall documents, however, do not include easy-to-use alternative lift mechanisms for a freestanding hardtop lift and removal device.

BRIEF SUMMARY OF THE INVENTION

In a preferred embodiment, an apparatus for removing, storing, and installing removable hardtop devices from vehicles comprising: a movable base unit which is sufficiently long and wide to support the apparatus from longitudinal and axial moments with and without the hardtop engaged; a vertical support structure having a lower and upper end, wherein said lower end is affixed to said movable base and said upper end is attached to a top platform assembly; a means for vertical lifting which is arranged at the vertical support structure and allows the apparatus to exert force vertically for removing the hard top from the vehicle, sustaining the hardtop at a fixed height once the hardtop has been removed from the vehicle, and allowing the hardtop to be controllably lowered onto the vehicle during installation; wherein the top platform assembly comprises a plurality of adjustable legs, each with a distal end comprising a bumper for contacting the hardtop; and wherein the apparatus may be positioned to the hardtop on the automobile and selectively raised or lowered by said vertical lifting means.

In another preferred embodiment, the apparatus as described herein, further comprising wherein molded pads are affixed to the outer surface of each bumper.

In another preferred embodiment, the apparatus as described herein, wherein the top platform assembly slopes upward away from the vertical support structure at an angle of 1 degree to five degrees and interfaces with the hardtop to distribute lifting forces evenly throughout the hardtop and is capable of securing and supporting the hard top longitudinally and axially while the hardtop is installed on the apparatus.

In another preferred embodiment, the apparatus as described herein, wherein the angle of slope of the top platform assembly is approximately three to six degrees.

In another preferred embodiment, the apparatus as described herein, further comprising wherein the apparatus is comprised of slidably assembled tubular components.

In another preferred embodiment, the apparatus as described herein, comprising alignment markers embodied as colored dimples are located on individual tubular components evidencing the location for alignment of other components upon assembly.

In another preferred embodiment, the apparatus as described herein, wherein each adjustable leg in the top platform assembly can be set with spring loaded push button retention pins.

In another preferred embodiment, the apparatus as described herein, wherein the top platform assembly comprises five adjustable legs.

In another preferred embodiment, the apparatus as described herein, further comprising wherein the means for vertical lifting which is connected to the vertical support structure comprises a lift lever connected to each of the vertical support structure and as a lever seat.

In another preferred embodiment, the apparatus as described herein, wherein the lift lever comprises a locking hinge.

In another preferred embodiment, the apparatus as described herein, wherein the means for vertical lifting is a pedal lift connected to each of the vertical support structure and the wheeled base unit.

In another preferred embodiment, the apparatus as described herein, wherein the pedal lift comprises a pedal lift lock embodied as a cord, locking spring and locking spring pin which, whereby the locking spring applies pressure to the spring pin, pushing it into one of a plurality of locking pin holes in a central tube and/or vertical support structure, thereby locking the apparatus at a set height.

In another preferred embodiment, an apparatus for removing, storing, and installing removable hardtop devices from vehicles comprising: a movable base unit which is sufficiently long and wide to support the apparatus from longitudinal and axial moments with and without the hardtop engaged; a vertical support structure having a lower and upper end, wherein said lower end is affixed to said movable base and said upper end is attached to a top platform assembly: a hand crank which is arranged at the vertical support structure and operating a screw jack within the vertical support structure and allows the apparatus to exert force vertically to raise the top platform assembly, thus removing the hard top from the vehicle, sustaining the hardtop at a fixed height once the hardtop has been removed from the vehicle, and allowing the hardtop to be controllably lowered onto the vehicle during installation; wherein the top platform assembly comprises a plurality of adjustable legs, each with a distal end comprising a bumper for contacting the hardtop; and wherein the apparatus may be positioned to the hardtop on the automobile and selectively raised or lowered by said vertical lifting means.

In another preferred embodiment, a method of removing a removable hardtop from a vehicle using the apparatus as described herein, such apparatus comprising a movable base structure, a vertical support structure, a means of vertical lifting and a top platform assembly, such method comprising the steps of: positioning the movable base unit to the back of the vehicle; positioning the vertical support structure having a lower end and upper end, wherein said lower end is affixed to said movable base and said upper end is attached to a means for vertical lifting; engaging the means for vertical lifting and thereby exerting vertical force to remove the hardtop from the vehicle, sustain the hardtop at a fixed height, and thereafter allow the hardtop to be controllably lowered onto the vehicle during reinstallation, and thereby lifting the hardtop with the top platform assembly, wherein the top platform assembly slopes upward away from the apparatus and interfaces with the hardtop to distribute lifting forces evenly throughout the hardtop.

In another preferred embodiment, the method of removing a removable hardtop from a vehicle using the apparatus as described herein, wherein engaging the means for vertical lifting comprises pulling downward on a lift lever to raise the top platform assembly and engaging a locking hinge.

In another preferred embodiment, the method of removing a removable hardtop from a vehicle using the apparatus as described herein, wherein engaging the means for vertical lifting comprises turning a hand crank and engaging a tongue jack or similar lifting means.

In another preferred embodiment, the method of removing a removable hardtop from a vehicle using the apparatus as described herein, wherein engaging the means for vertical lifting comprises depressing a pedal lift or similar lifting means.

DETAILED DESCRIPTION OF THE INVENTION

Figure 1:
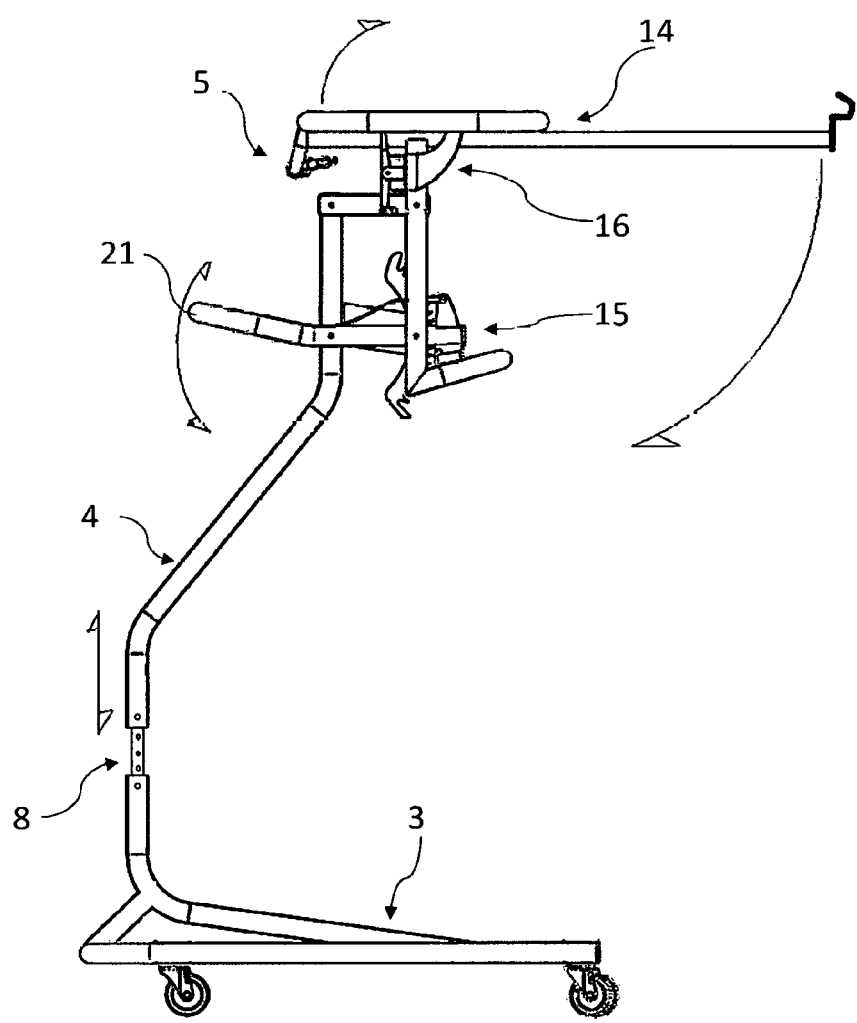
FIG. 1 is a side elevation view illustrating a sport utility vehicle hard top removal device of prior art.

As is known from prior art U.S. Pat. No. 9,643,823 and U.S. patent application Ser. No. 16/172,736, FIG. 1 shows a previous design for a device designed for the removal, storage, and installation of removable hardtops 1 (not pictured) from convertible sport utility vehicles 2 (not pictured). As depicted in FIG. 1, in general the device comprises a wheeled base unit 3, a vertical support structure 4 and a top platform assembly 5, wherein each such component is embodied as an interlocking tubular construction. The core components of the device are arranged such that the base unit 3 is aligned directly below the platform unit 5 and the vertical support structure 4 is connected to the rear of the base unit 3 and platform assembly 5 connecting the two together. The resulting structure is a "C" shaped unit, which is designed such that the weight and moment created when the hardtop unit 1 is loaded onto the platform assembly 5 its weight is counteracted and supported by the legs 6 of the base unit 3, preventing the device from toppling over.

Referring again to Prior Art, FIG. 2 shows the base unit 3 is comprised of a "U" shaped frame 9 with two legs 6 with four casters 3 affixed to the legs 6. The frame 9 of the base unit 3 connects to the vertical support 4 structure near the rear of the base frame 9. In the preferred embodiment the frame and the vertical support structure are tube in tube slide-over connections 8 with a plurality of aligning holes 12, through which pins can be inserted (not pictured) to allow for simple height adjustment, however, these two units could be affixed to each other in any manner known to those skilled in the art, such as brackets and welding.

The most critical design aspect of the base unit is that the horizontal distance between the end of the base legs 6 and the vertical support 4 be sufficient to prevent the unit from toppling over when the hardtop 1 is installed on the platform assembly 5. The ends of the base legs 6 should extend from the vertical support 4 to at least the horizontal location of center of mass of the unit, both with the hardtop installed and the hardtop removed and ideally a bit past the center of mass for added stability.

Additionally, the lateral distance between the two legs 6 needs to be sufficient to provide lateral support and prevent the unit from tipping over sideways, however, the distance cannot exceed the distance between the inner side of the tires of the SUV 10. Exceeding the distance between the inner sides of the tires 10 would prevent the legs 6 of the unit from being able to roll underneath SUV 2 so that the platform assembly 5 can align with the removable hardtop 1.

Attached to the underside of the legs 6 are four wheel and caster assemblies 7. These wheel and caster assemblies 7 allow the device to be aligned with the hard top 1 and roll away from the hardtop 1 once it has been detached from the SUV 2. In the preferred embodiment of the invention, the casters 7 are all free rotating, however, the casters 7 could be all fixed, a combination of fixed and free rotating casters 7, or any other arrangement known to those skilled in the art.

Figure 2:
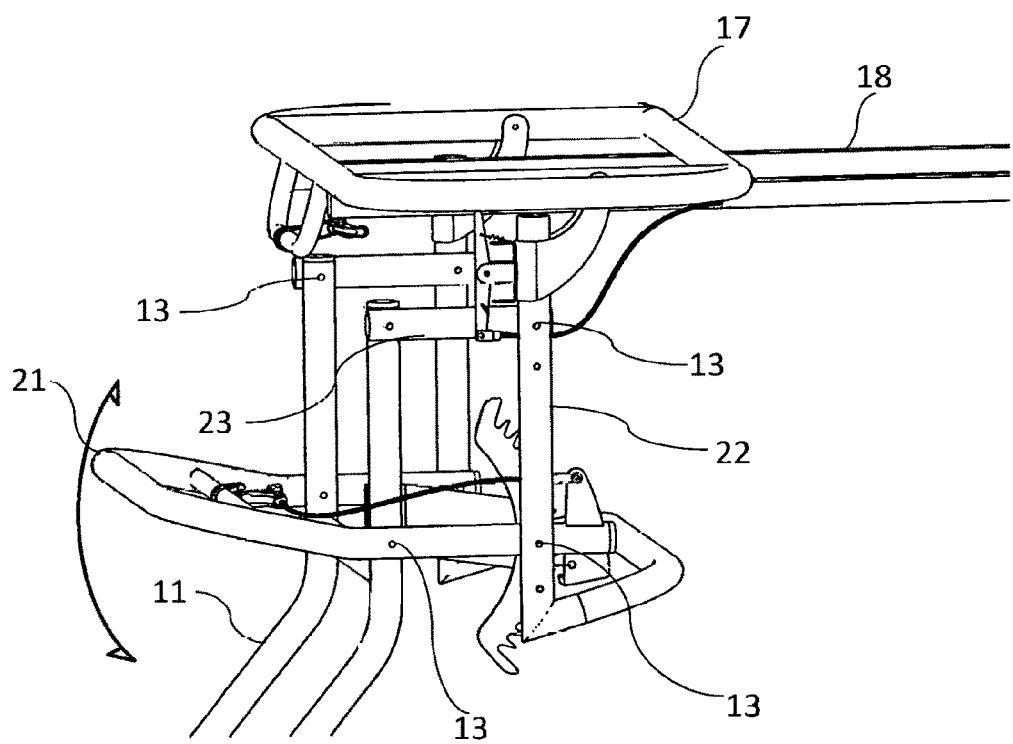
FIG. 2 is a perspective view of the base of the prior art device of FIG. 1.

In the prior art design of FIGS. 1 and 2, a vertical support structure 4 connects the base unit 3 and the platform assembly 5 is. The vertical support structure 4 comprises a single, or a plurality of vertical beams 11. In the preferred embodiment of the invention the vertical support structure 4 is variable in length to allow the device to be utilized with a variety of types of vehicles. In the preferred embodiment the variable height support beams 11 are hollow tube in tube structure 8 with a plurality of pin holes/pins 12 to allow for height adjustment. However, the inventor recognizes that height adjustment can be achieved through a number of methods known to those skilled in the art, such as, but not limited to, hydraulic or pneumatic cylinder and tube in tube structures with spring-loaded and/or push-button retention pins.

DETAILED DESCRIPTION OF THE FIGURES

Figure 3:
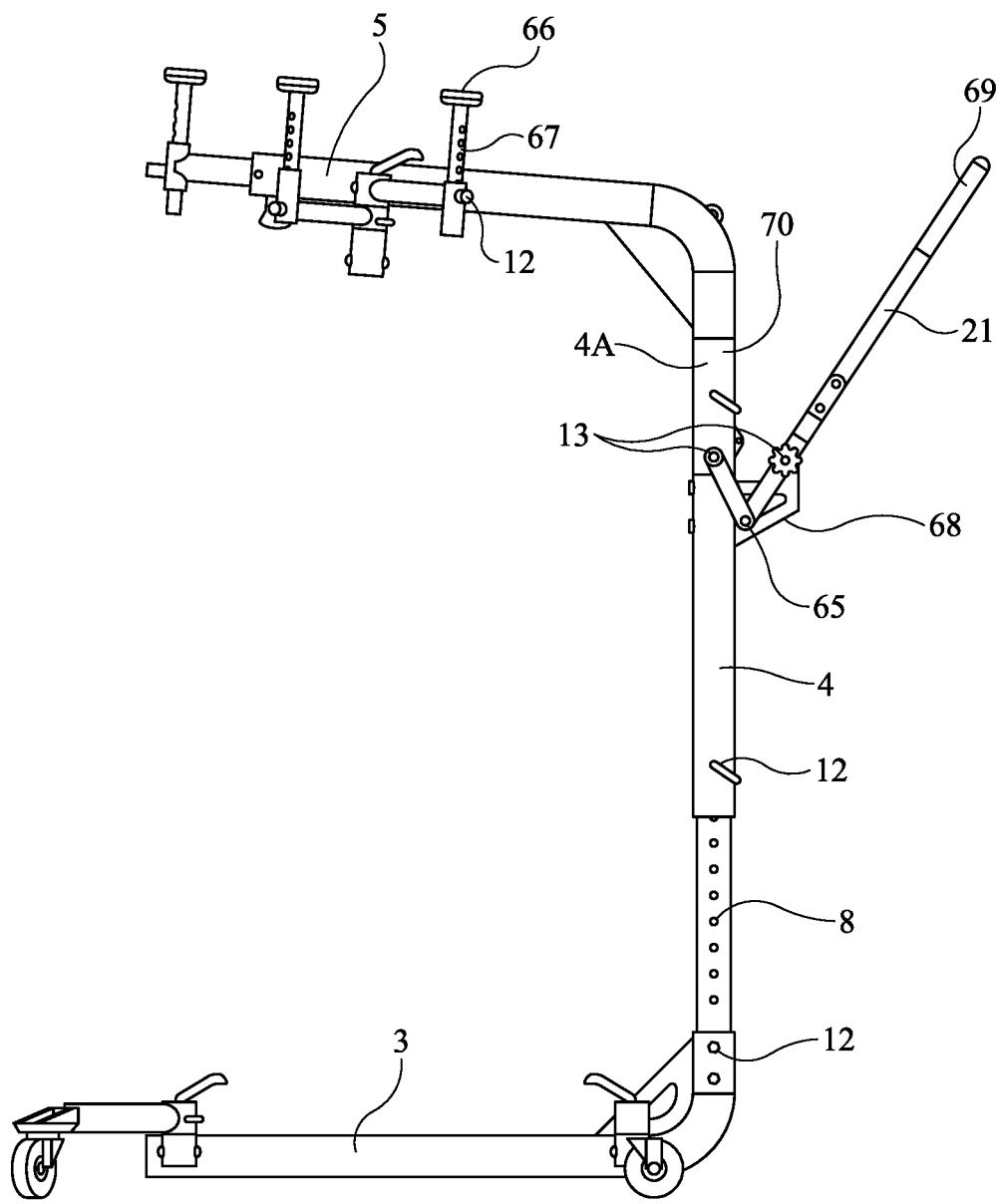
FIG. 3 is a side view of a first embodiment of the sport utility vehicle hard top removal device of the present invention.

FIG. 3 shows one embodiment of a hard top removal device comprising the present invention. Attached to the top of the vertical support structure 4 is a platform assembly 5, embodied as additional tubing affixed to the vertical support structure 4 and further comprising a plurality of adjustable legs 67, each ending in a bumper 66. In a preferred embodiment, there are three to six adjustable legs, with a more preferred number being five.

The hinged/pivoting connections 12 used throughout the device in the preferred embodiment are achieved through pins or bolts running through holes that are drilled in the tube frame. However, the inventor recognizes that hinged/pivoting connections 12 can be achieved through a number of methods known to those skilled in the art, such as, but not limited to, template hinges and pivot hinges.

In the design of FIG. 3, the vertical support structure 4 is straight instead of angled forward. Given the lack of angling, the base 3 may be longer from front to back than the design of the prior art. In this iteration, the lift lever 21 is embodied as a hinged lever attached to each of the main body of the vertical support structure 4 as well as a lever seat 68, which lever seat is embodied as a protrusion from the rear side of the vertical support structure, facing away from the wheeled base unit 3 and platform assembly 5. In this design, the left lever is attached in each location with a lever pin 71 or similar arrangement allowing for rotation such that, when the lever handle 29 is pulled downward, upward force is exerted on the vertical support structure 4 such that the upper portion 4A of the structure is lifted upward to bring the platform assembly into contact with, and then raise, removable hardtop 1. A locking hinge 65 is located on the left lever between the two pins, and the locking mechanism of such locking hinge allows the device to hold the hardtop in a raised position without requiring the user to hold the handle 69 down. The hinge may release with a button or similar disengagement mechanism.

As with the prior art version, the platform assembly of FIG. 3 is arranged as a plurality of tubes, but now with each tube terminating in a vertical, adjustable leg 67, preferably using spring-loaded buttons and corresponding drill holes in the leg tube to allow for an adjustable level between the hardtop and the tubes. In a preferred embodiment, the upper end of each leg terminates in a bumper 66, embodied as a flat surface, optionally covered with a layer of padding such as rubber or plastic to protect the underside of the hard top during removal and storage.

Unlike the prior art design, FIG. 3 also shows a wheeled base unit 3 comprising a single central tube with four tubes extending laterally therefrom, each comprising a caster 7 on its distal end. All such lateral tubes are adjustable using aligning holes/pins 12, shown as push-button snaps.

Figure 4:
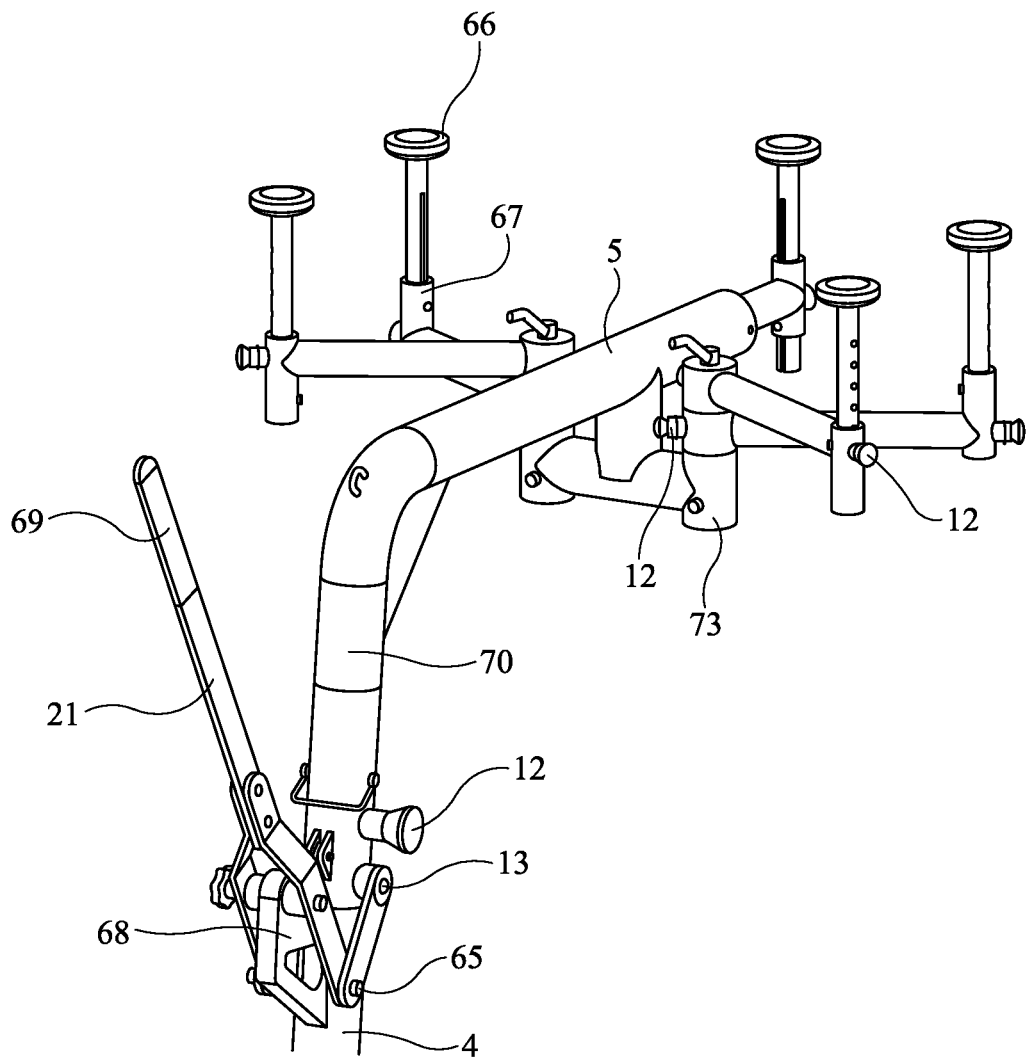
FIG. 4 is a perspective view of a lift lever and top platform assembly of the embodiment of FIG. 3.

FIG. 4 shows a perspective view of the upper portions of the embodiment of FIG. 3, including the top platform assembly 5 and lift lever 21. The platform assembly is shown as a somewhat star-shaped arrangement of tubing with each tube ending in an adjustable leg 67, which leg extends upward and terminates in a bumper 66. In this embodiment, such bumpers are disc-shaped, but alternate shapes are possible, preferably giving significant surface area to allow for increased stability upon raising the hardtop. Bumpers will also preferably comprise either coating or covers of cloth, rubber or a similar material both to protect the underside of the hardtop and to aid in stabilizing the connection.

The adjustment of the legs in the pictured embodiment is possible both vertically and laterally through a plurality of aligning holes and pins 12 in the tubing. In particular, FIG. 3 shows an optional design in which the platform assembly 5 comprises a single centrally-located tube connected to two tube hinges 73, which hinges allow the tubes connecting the adjustable legs to rotate laterally to adjustably fit different hardtop sizes and configurations.

FIG. 4 also shows a perspective view of the assembly of lift lever 21, with the handle in an upward position, locking hinge 65 in an open position and thus the platform assembly 5 in a lowered position. Lever seat 68 is visible attached to the rear of vertical support structure 4, allowing the two pivoting connections 13 to leverage upward the upper portion of the vertical support structure 70 and thereby the platform assembly.

Figure 5:
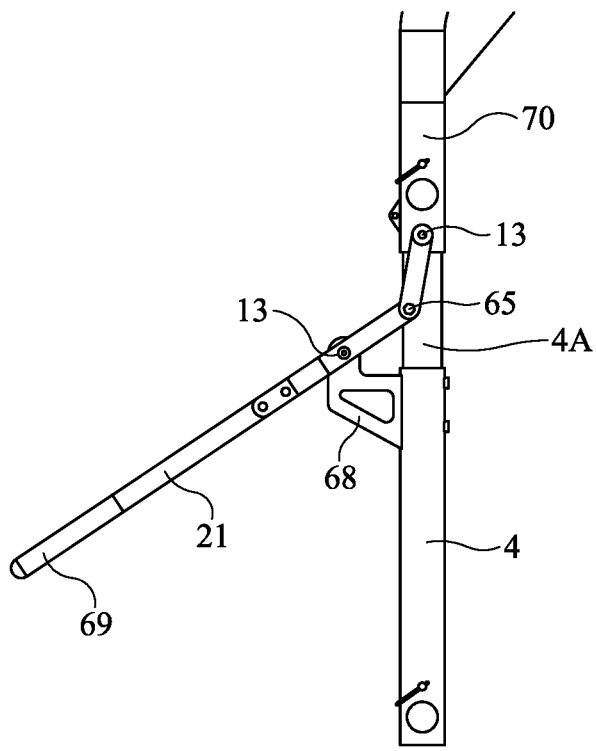
FIG. 5 is a side view of an alternate embodiment of the device of FIG. 3, with a hand crank.

FIG. 5 shows a side view of the central part of the embodiment of FIG. 3 comprising the lift lever 21 in which the handle 69 has been pulled downward and locking hinge 65 is approaching an open, locked position. The downward movement of the handle has leveraged the upper portion 70 upward, thus exposing the central tube 4A of the vertical support structure.

Figure 6:
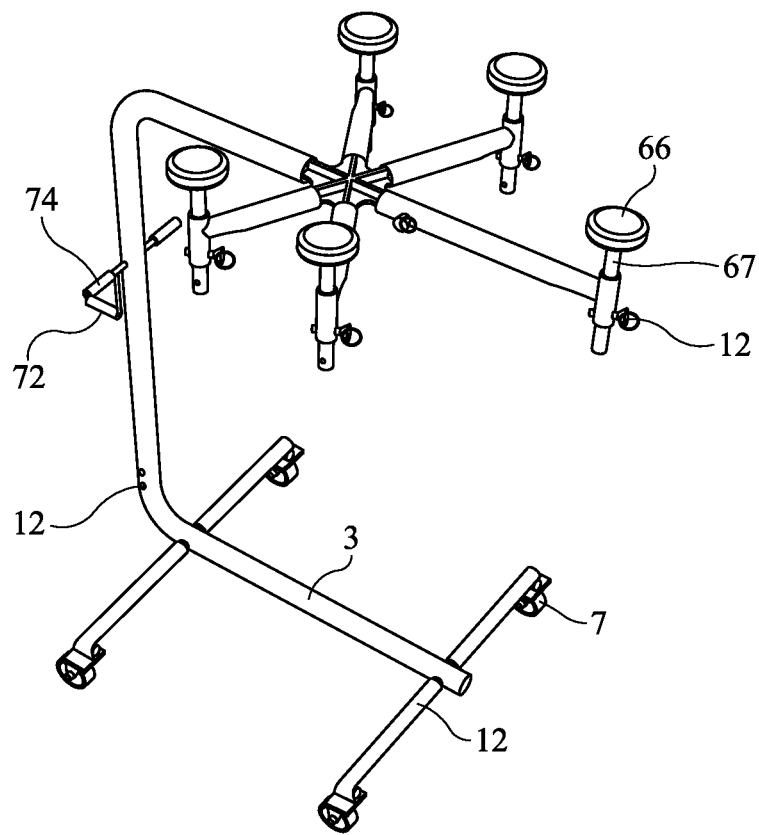
FIG. 6 is a top perspective view of the alternate embodiment of FIG. 5.

FIG. 6 shows an alternate embodiment of the design of FIG. 3, wherein the lift lever is replaced with a crank arm 72 attached to a tongue jack seated inside the tube construction of the vertical support structure. In a preferred embodiment, the jack structure is a known tongue jack design often used in trailer jacks, with the crank arm turning a screw (not pictured) centrally located within the tubular vertical support structure, wherein the upper portion 70 of such vertical support structure is an overlapping tube that is attached to the interior screw and raises and lowers. Push handles 73 are attached to the vertical support structure 4 on the sides for moving the device on its casters 7. FIG. 6 is a perspective view, showing the top platform assembly 5 comprising a single centrally-located tube and five adjustable legs 67 and bumpers 66, although without the lateral adjustment feature of FIG. 3. Crank arm 72 and push handles 73 are also pictured.

Figure 7:
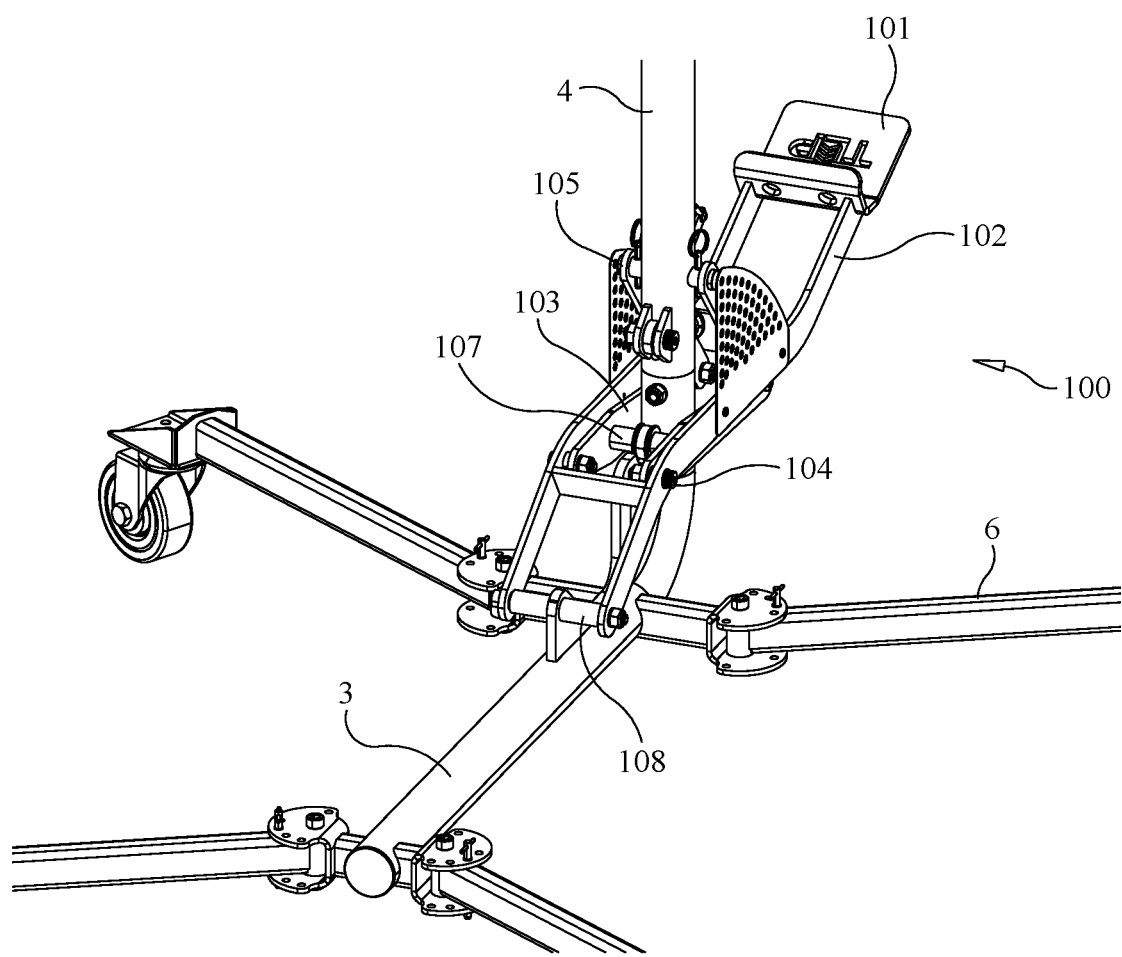
FIG. 7 is a close up view of a pedal lift assembly of the device of FIG. 6 in an undepressed position.

FIG. 7 is a close-up illustration of another alternate lifting mechanism, a pedal lift 100, with the pedal 101 undeployed in its upward position. In this position, no upward thrust has been applied by pedal lever 102 to pedal lift arm 103, which remains folded within the pedal lever. As a result, the vertical support structure 4 remains in its down position, directly in contact with the tubular frame of the wheeled base unit 3.

Figure 8:
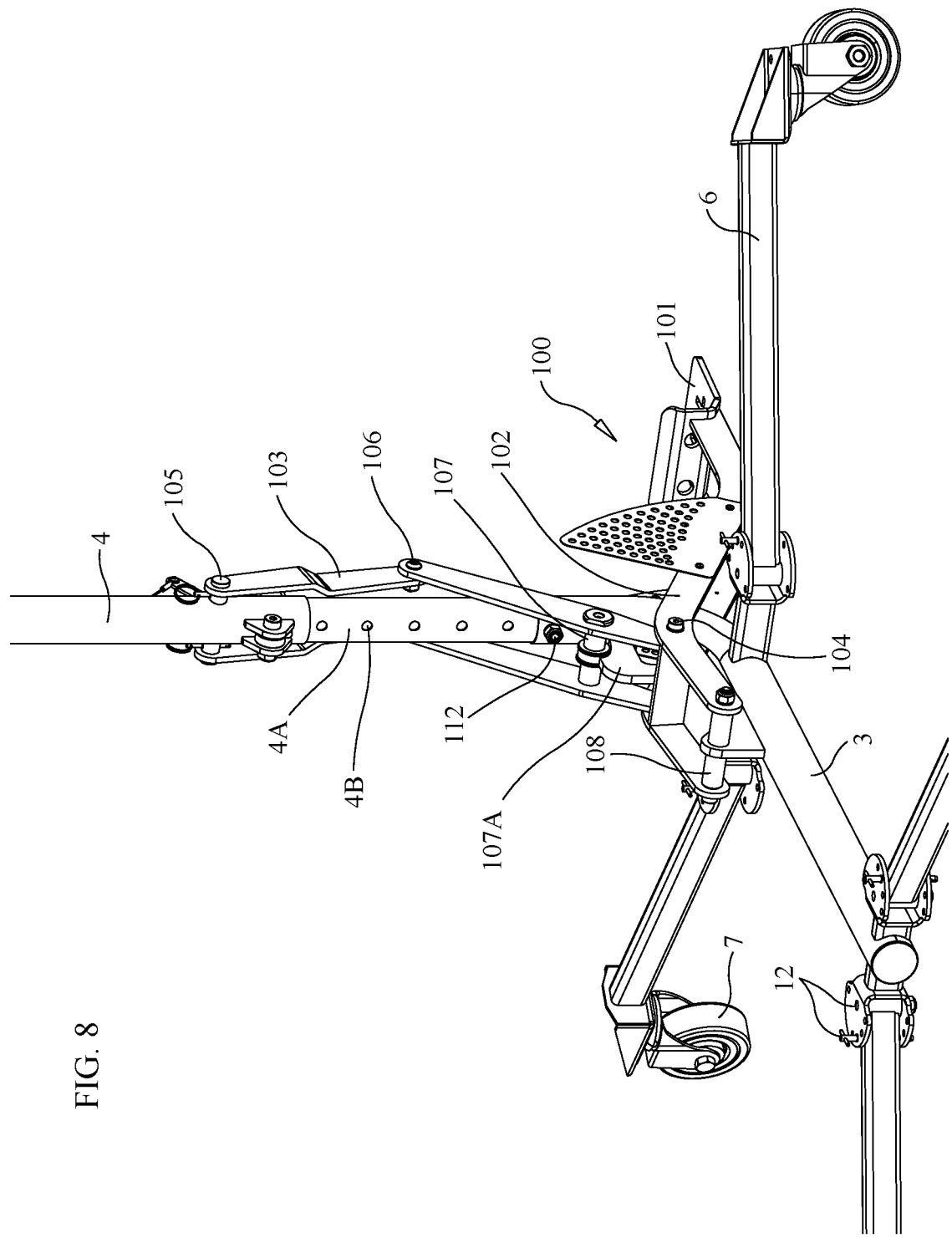
FIG. 8 is a close up view of a pedal lift assembly of the device of FIG. 6 in a depressed position.

FIG. 8 provides a second illustration of pedal lift 100, this time with the pedal 101 depressed, thus rotating the pedal lever 102 on the pedal lever hinge 108, seated on the wheeled base unit 3. The pedal depression forces the lower lift arm joint 104 downward, pulling the attached end of the pedal lift arm 103 downward and rotating the lift arm bolt 107 in the lift arm bolt seat 107A on the wheeled base. This action straightens the lift arm hinge 106, thus elongating the pedal lift arm and raising the vertical support structure 4 via the upper lift arm joint 105. This action exposes the central tube 4A, which comprises a plurality of locking pin holes 4B.

Figure 9:
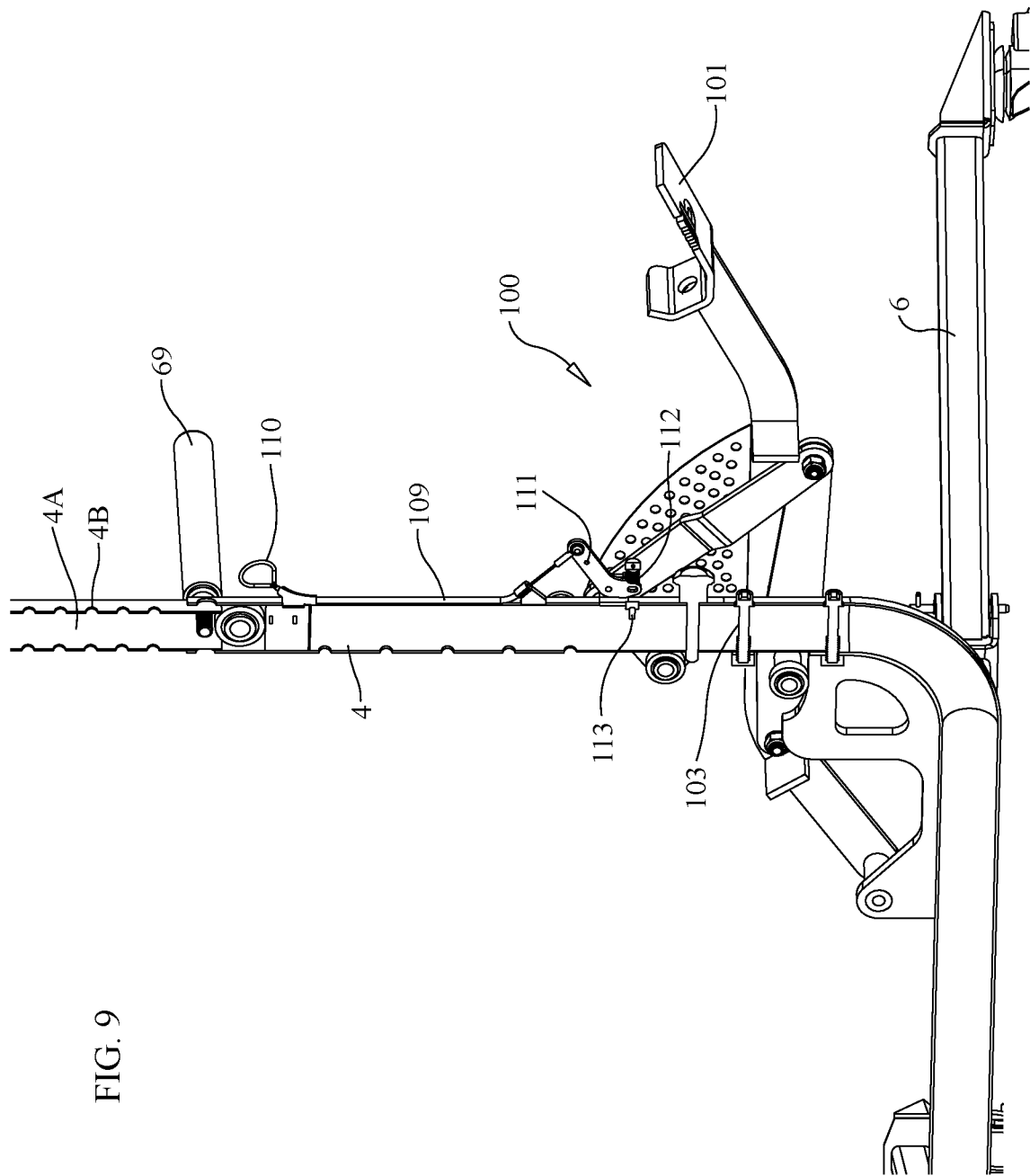
FIG. 9 is an alternate view of the pedal lift assembly of FIG. 6.

FIG. 9 provides a third illustration of pedal lift 100 from an alternate angle, this time evidencing the wire and ring of the pedal lift lock 109 terminating in pedal lift lock ring 110, which is to be engaged with a finger or thumb of the user while the pedal 101 is depressed by the user's foot. By pulling up on pedal lift lock ring 110, the user pulls upward on curved spring plate 111, thereby compressing spring locking spring 112 and withdrawing locking spring pin 113 away from vertical support structure 4 and central tube 4A. To further ease the raising process, the user may engage the lock ring while also holding and upplying upward pressure on the handle 69 using one or both hands. The simultaneous engagement of the pedal lift, pedal lift lock and optionally the handle allows the vertical support structure to move upward to a desired height. The subsequent disengagement of the pedal lift lock then allows the locking spring 112 to decompress, thereby inserting the locking spring pin 113 back into the vertical support structure/central tube and causing the pin to enter one of the plurality of locking pin holes 4B, thereby securing the top frame 5 (not pictured) at the desired height. In a possible arrangement, locking pin holes exist in both the outer sheath of the vertical support structure and the inner central tube, overlaying at certain lift levels and allowing the locking spring pin to be inserted into two such overlaying holes simultaneously. In another arrangement, the locking spring pin inserts directly into a locking pin hole in the central tube. Preferably, the pedal lift lock will allow for setting the elevation of the top frame at preset increments, such as 1" or 2" increments.

In a preferred embodiment, each caster mechanism, the top assembly and the entire device are foldable for ease of storage and transportation.

While the description above describes a device designed for the removal of SUV convertible tops, as there is currently a demand for this type of device, the described device with minor modifications known to those skilled in the art could also be used for removing different types of vehicle tops and doors, including but not limited to removable hardtops for cars, and caps for truck beds.

It would be appreciated by those skilled in the art that various changes and modifications can be made to the illustrated embodiments without departing from the spirit of the present invention. All such modifications and changes are intended to be covered by the appended claims.

LIST OF REFERENCE NUMBERS 1 removable hardtop
2 convertible SUV
3 wheeled base unit
4 vertical support structure
4A central tube
5 platform assembly
α slope angle of platform assembly
6 legs
7 casters (wheels)
8 slide-over connections (not pictured)
9 U-shaped frame (bottom component)
10 tires (of SUV)
11 variable height support beams
12 aligning holes, pins
13 hinged/pivoting connections
14 hardtop interface platform
15 ratcheting lift assembly
16 tilting assembly
17 SUV top platform
18 removable support rails
18A removable support rail extension
19 front edge grip
20 groove or notch (in hardtop)
21 lift lever
65 locking hinge
66 bumper
67 adjustable leg
68 lever seat
69 handle
70 upper portion of vertical support structure
71 lift lever attachments
72 crank arm
73 push handle
100 pedal lift
101 pedal
102 pedal lever
103 pedal lift arm
104 lower lift arm joint 105 upper lift arm joint
106 lift arm hinge
107 lift arm bolt
107A lift arm bolt slot
108 pedal lever hinge
109 pedal lift lock
110 pedal lift lock ring
111 spring plate
112 locking spring
113 locking spring pin The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. An apparatus for removing, storing, and installing removable hardtop devices from vehicles comprising:
   a movable base unit which is sufficiently long and wide to support the apparatus from longitudinal and axial moments with and without the hardtop engaged;
   a vertical support structure having a lower and upper end, wherein said lower end is affixed to said movable base and said upper end is attached to a top platform assembly:
   a means for vertical lifting which is arranged at the vertical support structure and allows the apparatus to exert force vertically for removing the hard top from the vehicle, sustaining the hardtop at a fixed height once the hardtop has been removed from the vehicle, and allowing the hardtop to be controllably lowered onto the vehicle during installation;
   wherein the top platform assembly comprises a plurality of adjustable legs, each with a distal end comprising a bumper for contacting the hardtop;
   wherein the apparatus may be positioned to the hardtop on the automobile and selectively raised or lowered by said vertical lifting means; and
   wherein the means for vertical lifting is a pedal lift connected to each of the vertical support structure and the wheeled base unit and the pedal lift comprises a pedal lift lock embodied as a cord, locking spring and locking spring pin which, whereby the locking spring applies pressure to the spring pin, pushing it into one of a plurality of locking pin holes in a central tube and/or vertical support structure, thereby locking the apparatus at a set height.

2. The apparatus of claim 1, further comprising wherein molded pads are affixed to the outer surface of each bumper.

3. The apparatus of claim 1, wherein the top platform assembly slopes upward away from the vertical support structure at an angle of 1 degree to five degrees and interfaces with the hardtop to distribute lifting forces evenly throughout the hardtop and is capable of securing and supporting the hard top longitudinally and axially while the hardtop is installed on the apparatus.

4. The apparatus of claim 3, wherein the angle of slope of the top platform assembly is approximately three to six degrees.

5. The apparatus of claim 1, further comprising wherein the apparatus is comprised of slidably assembled tubular components.

6. The apparatus of claim 5, comprising alignment markers embodied as colored dimples are located on individual tubular components evidencing the location for alignment of other components upon assembly.

7. The apparatus of claim 1, wherein each adjustable leg in the top platform assembly can be set with spring loaded push button retention pins.

8. The apparatus of claim 1, wherein the top platform assembly comprises five adjustable legs.

9. The apparatus of claim 1, further comprising wherein the means for vertical lifting which is connected to the vertical support structure comprises a lift lever connected to each of the vertical support structure and as a lever seat.

10. The apparatus of claim 9, wherein the lift lever comprises a locking hinge.

11. A method of removing a removable hardtop from a vehicle using the apparatus of claim 1, such apparatus comprising a movable base structure, a vertical support structure, a means of vertical lifting and a top platform assembly, such method comprising the steps of:
    positioning the movable base unit to the back of the vehicle;
    positioning the vertical support structure having a lower end and upper end, wherein said lower end is affixed to said movable base and said upper end is attached to a means for vertical lifting;
    engaging the means for vertical lifting and thereby exerting vertical force to remove the hardtop from the vehicle, sustain the hardtop at a fixed height, and thereafter allow the hardtop to be controllably lowered onto the vehicle during reinstallation, and thereby
    lifting the hardtop with the top platform assembly, wherein the top platform assembly slopes upward away from the apparatus and interfaces with the hardtop to distribute lifting forces evenly throughout the hardtop.

12. The method of claim 11, wherein engaging the means for vertical lifting comprises pulling downward on a lift lever to raise the top platform assembly and engaging a locking hinge.

13. The method of claim 11, wherein engaging the means for vertical lifting comprises turning a hand crank and engaging a tongue jack or similar lifting means.

14. The method of claim 11, wherein engaging the means for vertical lifting comprises depressing a pedal lift or similar lifting means.

* * * * *